July 7, 1953        M. VICK        2,644,504
BICYCLE SEAT HEIGHT ADJUSTING MEANS
Filed May 23, 1950
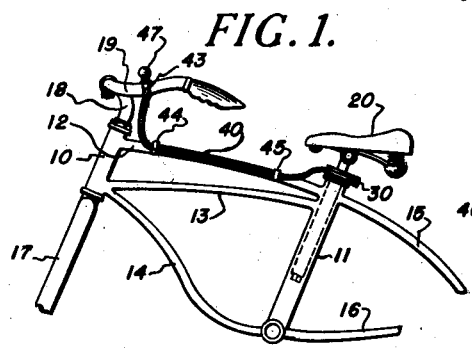
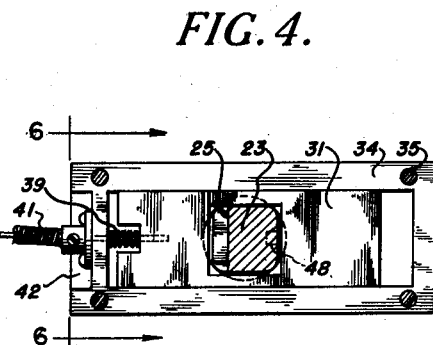
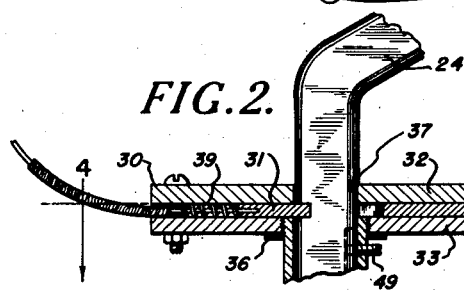
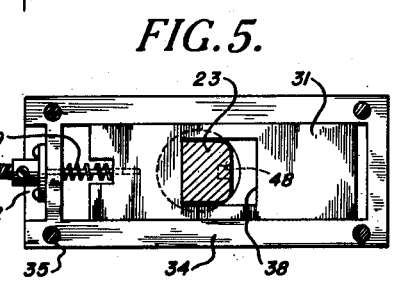
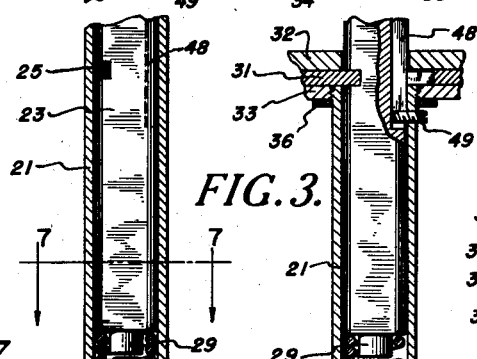
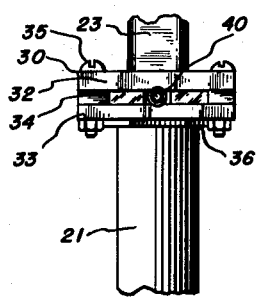
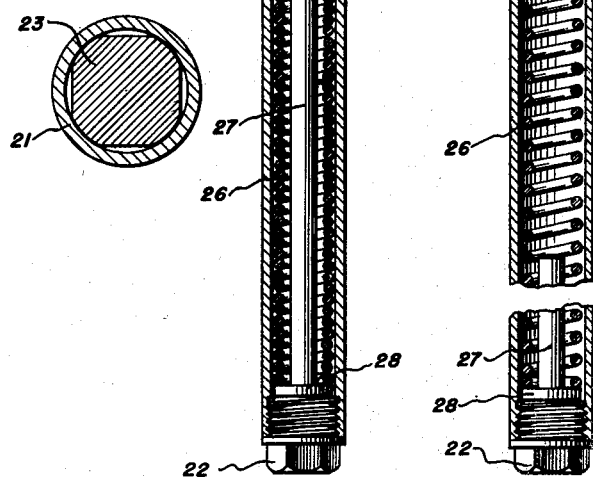
*INVENTOR.*
MILLARD VICK
BY
*McMorrow, Berman & Davidson*
ATTORNEYS Patented July 7, 1953

2,644,504

UNITED STATES PATENT OFFICE 2,644,504

BICYCLE SEAT HEIGHT ADJUSTING MEANS

Millard Vick, Portsmouth, Va.

Application May 23, 1950, Serial No. 163,657

2 Claims. (Cl. 155—5.24)

This invention relates to bicycle seat height adjusting means and more particularly to means for adjusting the height of a bicycle seat while the bicycle is being ridden.

It is among the objects of the invention to provide an improved bicycle seat height adjusting means which can be used to adjustably raise and lower the bicycle seat while the bicycle is being ridden and which includes an improved latch mechanism for positively locking the seat in adjusted position, which has a positive stop for limiting downward movement of the seat to the lowermost position of adjustment and for avoiding damage to the latch mechanism, which can be installed on an existing bicycle with no material modification of the bicycle construction and does not interfere in any way with the normal operation of the bicycle, and which is simple and durable in construction, economical to manufacture, easy to install, and neat and attractive in appearance.

Other objects and advantages will become apparent from a consideration of the following description and the appended claims in conjunction with the accompanying drawing, wherein:

Figure 1 is a side elevation of a fragmentary portion of a bicycle with seat adjusting means illustrative of the invention operatively installed thereon;

Figure 2 is a longitudinal, medial cross sectional view on an enlarged scale of the seat height adjusting means illustrated in Figure 1;

Figure 3 is a view similar to Figure 2 of a fragmentary portion of the seat height adjusting means showing the parts in a different operative position from that illustrated in Figure 2;

Figure 4 is a transverse cross sectional view on the line 4—4 of Figure 2;

Figure 5 is a cross sectional view similar to Figure 4 but showing the parts in a different operative position from that illustrated in Figure 4;

Figure 6 is a front elevational view of a fragmentary upper portion of the seat height adjusting means showing structural details; and Figure 7 is a transverse cross sectional view on an enlarged scale on the line 7—7 of Figure 2.

With continued reference to the drawing, the fragmentary portion of the bicycle frame illustrated in Figure 1 includes a front fork journal sleeve or tube 10, a rear tubular post 11, longitudinal members 12, 13 and 14 connecting the front fork journal sleeve 10 to the rear post 11, and rear forks 15 and 16 for the rear bicycle wheel, not illustrated. A front fork 17 is journaled in the journal tube or sleeve 10 and a handle bar post 18 extends upwardly from the front fork 17 and the upper end of the journal tube 10 and the handle bar unit 19 is secured to the top of this post. The bicycle seat 20 is supported above the upper end of the rear post 11 of the frame and, in accordance with the present invention, seat height adjusting means are interposed between the post 11 and the seat 20.

The seat height adjusting means comprises an elongated sleeve 21 which is externally screw threaded at one end and internally screw threaded at its opposite end and is received in the rear post 11 as is clearly indicated in Figure 1. A screw plug 22 is threaded into the internally screw threaded end of the sleeve 21 and constitutes a spring abutment and an elongated seat post 23 is slidably received in the sleeve 21 and extends from the externally screw threaded end of the sleeve. At its outer end this seat post is provided with a seat engaging formation 24 and is provided with longitudinally aligned and spaced apart notches 25.

A coiled compression spring 26 is disposed in the sleeve 21 between the spring abutment plug 22 and the inner end of the seat post 23 to resiliently urge the seat post outwardly of the sleeve 21 and a pin 27 is disposed within the spring 26 and has at one end a head 28 which rests on the inner end of the screw plug 22. The seat post is provided on its inner end with a spring guide boss 29 and the pin 27 has a length such that when the seat post is in its lowest position of adjustment the head 28 of the pin rests on the inner end of the plug 22 and the upper end of the pin engages the end of the boss 29 so that the pin 27 constitutes a positive limit stop for downward movement of the seat post and precludes downward movement of the post beyond the lowest position of adjustment of the post relative to the sleeve 21.

A latch unit is secured on the upper, externally screw threaded end of the sleeve 21 and comprises a hollow housing 30 and a latch bolt 31 slidably mounted in the hollow housing.

In the arrangement illustrated, the hollow housing 30 comprises an upper plate 32 of rectangular shape, a lower plate 33 also of rectangular shape and an apertured rectangular spacer 34 disposed between the marginal portions of the upper and lower plates and holding the plates in substantially parallel relationship spaced apart a distance substantially equal to the thickness of the flat, rectangular bolt 31. The upper and lower plates 32 and 33 of the housing and the spacer 34 are secured together in assembled relationship by suitable means, such as the bolts 35 and the lower plate 33 is provided with a centrally located, internally screw threaded aperture which receives the externally screw threaded upper end of the sleeve 21. The housing may be secured in proper position on the sleeve by a shoulder or lock nut 36 mounted on the sleeve and contacting the lower, outer side of the lower plate 33 around the sleeve receiving aperture in this plate.

The upper plate 32 has a post receiving aperture 37 therein in alignment with the sleeve receiving aperture in the lower plate. The post 23 is preferably of polygonal cross sectional shape, as is particularly illustrated in Figure 7 and the aperture 37 in plate 32 is of rectangular or polygonal shape and fits the post 23 so that the post cannot rotate in the housing 30.

The latch bolt 31 is shorter than the opening in the spacer 34 so that the bolt can slide longitudinally within the housing 30. The bolt is provided with an opening 38, preferably of rectangular shape, the opening 38 having a width slightly greater than the post 23 but a length larger than the width of the post 23, through which the seat post 23 slidably extends.

The bolt 31 has a thickness slightly less than the width of the notches 25 in the seat post and when the bolt is in its operative position, as illustrated in Figure 5, the bolt at one side of the opening 38 therein is engaged in a selected notch in the seat post to hold the post at the corresponding position of adjustment relative to the sleeve 21. A coiled compression spring 39 is disposed between one end of the bolt 31 and the adjacent end of the housing spacer 34 to resiliently urge the bolt into engagement in the notches of the seat post 23. A Bowden wire 40 extends from the housing 30 to the handle bars 19 of the bicycle and has its casing 41 secured at one end to the housing 30 by a suitable clamp 42 and secured at its opposite end to the handle bars 19 by a clamp 43. Clamps 44 and 45 secure the Bowden wire intermediate its length to the upper longitudinal member 12 of the bicycle frame. The spacer 34 has an aperture in its front end and the core wire 46 of the Bowden cable extends through this aperture and through the spring 39 and is secured to the latch bolt 31. A hand knob 47 is secured on the other end of the core wire 46 so that this wire can be manually pulled through the casing 41 to move the bolt 31 against the force of spring 39 in a direction to release the bolt from engagement in the notches of the seat post, the bolt when in post disengaging position being shown in Figure 4.

When the bicycle rider desires to change the height of the seat, he adjusts his weight on the seat by placing the necessary portion of his weight on the bicycle pedals, until the bolt 31 is substantially free. He then pulls on the knob 47 to release the bolt from the notch in the seat post in which the bolt is engaged and then either raises himself if he desires a higher seat adjustment or lowers himself if he desires a lower seat adjustment until substantially the desired seat height is obtained. He then releases the knob and moves the seat up and down a slight amount until the nearest notch in the seat post is brought into alignment with the bolt 31 whereupon the spring 39 springs the bolt into the notch and locks the seat post at the desired position of adjustment. If the weight of the rider is suddenly applied to the seat while the tongue 31 is disengaged from all of the notches in the seat post the post will descend until its spring guide boss 29 contacts the upper end of pin 27 whereupon the post is stopped and the bolt then engages in the notch 25 corresponding to the lowest position of adjustment of the seat post. This prevents damage to the latch mechanism by impact of the descending seat post on the tongue of the latch mechanism when the notch corresponding to the lowest position of adjustment of the seat post comes opposite the tongue.

Suitable means are provided for restraining the spring 26 from moving the seat post entirely out of the sleeve 21 if the knob 47 is pulled while the weight of a rider is not on the bicycle seat. Such means may conveniently comprise an elongated groove 48 provided in the seat post and having a length longitudinal of the post substantially equal to the distance between the end notches 25. A set screw or pin 49 is inserted through the sleeve 21 and engages at its inner end in the groove 48 so that upward movement of the seat post will be stopped when this pin comes to the lower end of the groove 48. When it is desired to remove the seat post entirely from the sleeve the screw or pin 49 must be withdrawn to free the seat post.

The invention may be embodied in other specific forms without departing from the spirit or essential characteristics thereof. The present embodiment is, however, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a support for a vehicle seat, a tubular post having a closed lower end and an open upper end, a housing mounted on the upper end of the post and extending crosswise of said post and extending beyond opposite sides of the post, said housing being formed with a chamber extending lengthwise within the housing and opening through one end of the housing, a latch bolt slidably confined in said chamber for movement lengthwise of the housing, said latch bolt being formed with an opening at a point intermediate the ends of the latch bolt, a polygonal seat post slidably positioned through the open upper end of said tubular post and rising through the opening in the latch bolt, said seat post being formed with vertically spaced notches, said opening in the latch bolt having a width only slightly greater than the width of the seat post and providing opposed edges on the latch bolt slidably engaging sides of the seat post, and precluding rotation of the seat post relative to the housing, said latch bolt opening being elongated in the direction of the length of the latch bolt and being longer than the width of the seat post whereby said latch bolt can be moved endwise relative to the housing and to the seat post, said latch bolt opening providing a notch engaging edge on said latch bolt at one end of said opening, for engaging in selected notches of the seat post, spring means biasing the latch bolt in a direction to normally engage the notch engaging edge of the latch bolt with notches of the seat post, and releasing means connected to the latch bolt and extending from the housing for retracting the latch bolt against the resistance of said spring means.

2. In a support for a vehicle seat, a tubular post having a closed lower end and an open upper end, a housing mounted on the upper end of the post and extending crosswise of said post and extending beyond opposite sides of the post, said housing being formed with a chamber extending lengthwise within the housing and opening through one end of the housing, a latch bolt slidably confined in said chamber for movement lengthwise of the housing, said latch bolt being formed with an opening at a point intermediate the ends of the latch bolt, a polygonal seat post slidably positioned through the open upper end of said tubular post and rising through the opening in the latch bolt, said seat post being formed with vertically spaced notches, said opening in the latch bolt having a width only slightly greater than the width of the seat post and providing opposed edges on the latch bolt slidably engaging sides of the seat post, and precluding rotation of the seat post relative to the housing, said latch bolt opening being elongated in the direction of the length of the latch bolt and being longer than the width of the seat post whereby said latch bolt can be moved endwise relative to the housing and to the seat post, said latch bolt opening providing a notch engaging edge on said latch bolt at one end of said opening, for engaging in selected notches of the seat post, spring means biasing the latch bolt in a direction to normally engage the notch engaging edge of the latch bolt with notches of the seat post, and releasing means connected to the latch bolt and extending from the housing for retracting the latch bolt against the resistance of said spring means, said seat post terminating at its lower end in a reduced pin defining a shoulder surrounding said pin on the lower end of the seat post, a helical expanding spring in said tubular post, said spring having a lower end and an upper end, the upper end of the spring abutting said shoulder and surrounding said pin, a shaft extending longitudinally in said helical spring, said shaft having a lower end formed with an enlarged head with which the lower end of the spring is abutted, said head being arranged to abut the closed lower end of the tubular post, said shaft having an upper end normally spaced from said pin and arranged to be engaged by said pin as said seat post is moved downwardly against the resistance of said helical spring to an extreme depressed position.

MILLARD VICK.

References Cited in the file of this patent

UNITED STATES PATENTS

| Number | Name | Date |
|---|---|---|
| 427,076 | Hamminger | May 6, 1890 |

FOREIGN PATENTS

| Number | Country | Date |
|---|---|---|
| 149,036 | Austria | Mar. 25, 1937 |
| 558,420 | Germany | Sept. 7, 1932 |
| 23,530 | Great Britain | 1901 |